United States Patent
Kandangath et al.

(10) Patent No.: US 11,959,751 B2
(45) Date of Patent: Apr. 16, 2024

(54) CORRECTING COMPASS VIEW USING MAP DATA

(71) Applicant: Apple Inc., Cupertino, CA (US)

(72) Inventors: Anil K. Kandangath, Santa Clara, CA (US); Adam S. Howell, Oakland, CA (US); Ronald K. Huang, San Jose, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 270 days.

(21) Appl. No.: 15/166,202

(22) Filed: May 26, 2016

(65) Prior Publication Data
US 2017/0343361 A1    Nov. 30, 2017

(51) Int. Cl.
| | | |
|---|---|---|
| G01C 21/00 | (2006.01) | |
| G01C 21/16 | (2006.01) | |
| G01C 21/30 | (2006.01) | |
| G01C 21/36 | (2006.01) | |
| G01C 22/00 | (2006.01) | |

(52) U.S. Cl.
CPC ......... *G01C 21/30* (2013.01); *G01C 21/1654* (2020.08); *G01C 21/3676* (2013.01); *G01C 21/3694* (2013.01); *G01C 22/006* (2013.01)

(58) Field of Classification Search
CPC .. B60K 31/0066; G01C 21/30; G01C 21/165; G01C 21/3676; G01C 21/3694; G01C 22/0006; G01C 17/38; G01C 21/005; G06K 9/0061; H04W 4/026; B43L 11/041; B63H 25/04; G04B 47/065; G04D 7/1278
See application file for complete search history.

(56) References Cited

U.S. PATENT DOCUMENTS

| | | | | |
|---|---|---|---|---|
| 4,698,912 A | * | 10/1987 | Fowler ................... | G01C 17/38 |
| | | | | 33/356 |
| 5,737,226 A | * | 4/1998 | Olson .................... | G01C 17/38 |
| | | | | 701/530 |
| 6,028,550 A | * | 2/2000 | Froeberg ................ | G01C 21/28 |
| | | | | 342/357.29 |

(Continued)

FOREIGN PATENT DOCUMENTS

| | | | | |
|---|---|---|---|---|
| EP | 1793200 A1 | * | 6/2007 | ............. G01C 17/38 |
| WO | WO2016178031 | * | 5/2016 | |

OTHER PUBLICATIONS

Roy, Nirupam & Wang, He & Choudhury, Romit. (2014). I am a smartphone and I can tell my user's walking direction. MobiSys 2014—Proceedings of the 12th Annual International Conference on Mobile Systems, Applications, and Services. 10.1145/2594368. 2594392. (Year: 2014).*

*Primary Examiner* — Elaine Gort
*Assistant Examiner* — Brittany Renee Peko
(74) *Attorney, Agent, or Firm* — Aikin & Gallant, LLP (57) ABSTRACT

Systems, methods, devices and computer-readable storage mediums are disclosed for correcting a compass view using map data. In an implementation, a method comprises: receiving, by one or more sensors of a mobile device, sensor data; determining, by a processor of the mobile device, compass offset data for a compass view based on the sensor data and map data; determining, by the processor, a corrected compass view based on the compass offset data; and presenting, by the processor, the corrected compass view.

22 Claims, 5 Drawing Sheets

(56) References Cited

U.S. PATENT DOCUMENTS

| | | | |
|---|---|---|---|
| 6,366,856 B1* | 4/2002 | Johnson | G01S 5/02 |
| | | | 701/213 |
| 8,370,097 B2 | 2/2013 | Patel et al. | |
| 9,121,706 B2 | 9/2015 | Wright et al. | |
| 2006/0041375 A1* | 2/2006 | Witmer | G01C 15/00 |
| | | | 701/532 |
| 2007/0042790 A1* | 2/2007 | Mohi | H04W 4/024 |
| | | | 455/456.5 |
| 2008/0091327 A1* | 4/2008 | Tsuchiya | B60K 31/0066 |
| | | | 701/93 |
| 2008/0123994 A1* | 5/2008 | Schultz | G06T 3/4038 |
| | | | 382/284 |
| 2010/0307016 A1* | 12/2010 | Mayor | G01C 17/38 |
| | | | 33/356 |
| 2010/0312509 A1* | 12/2010 | Patel | G01C 17/38 |
| | | | 702/92 |
| 2011/0131825 A1* | 6/2011 | Mayor | G01C 17/38 |
| | | | 33/356 |
| 2013/0237255 A1 | 9/2013 | Shinada | |
| 2014/0357312 A1* | 12/2014 | Davis | G06F 3/04842 |
| | | | 455/550.1 |
| 2015/0006099 A1* | 1/2015 | Pham | G01C 17/38 |
| | | | 702/93 |
| 2015/0025917 A1* | 1/2015 | Stempora | G06K 9/0061 |
| | | | 705/4 |
| 2015/0089823 A1 | 4/2015 | Garrone | |
| 2015/0281884 A1* | 10/2015 | Smith | H04W 4/02 |
| 2016/0027298 A1* | 1/2016 | Peterson | G08G 1/056 |
| | | | 340/935 |
| 2016/0161259 A1* | 6/2016 | Harrison | G01S 19/48 |
| | | | 701/409 |
| 2016/0234635 A1* | 8/2016 | Chen | H04W 4/02 |
| 2016/0373647 A1* | 12/2016 | Garcia Morate | H04N 5/23222 |
| 2018/0112986 A1* | 4/2018 | Putnam | G01C 21/3632 |

* cited by examiner

CORRECTING COMPASS VIEW USING MAP DATA

TECHNICAL FIELD

This disclosure relates generally to compass applications for mobile devices.

BACKGROUND

Many modern mobile devices can execute a software map application that provides turn-by-turn navigation directions in visual and/or audio formats. These mobile devices can include satellite and/or terrestrial positioning technology to determine the location of the mobile device on a map. Some map applications provide a compass view that allows users to orient themselves in an unfamiliar location. The compass view often includes a graphical direction indicator (e.g., a cone) that is overlaid on the map at the location of the mobile device and rotates with the mobile device. In some magnetically challenged environments (e.g., urban environments), the compass heading will have a bias that causes the direction indicator to be continuously offset by an angle with respect to map data, such as the centerline of a street on which the user is walking. This offset angle can provide the user with a poor navigation experience.

SUMMARY

Systems, methods, devices and non-transitory, computer-readable storage mediums are disclosed for correction a compass view using map data.

In some implementations, a method comprises: receiving, by one or more sensors of a mobile device, sensor data; determining, by a processor of the mobile device, compass offset data for a compass view based on the sensor data and map data; determining, by the processor, a corrected compass view based on the compass offset data; and presenting, by the processor, the corrected compass view.

In some implementations, a mobile device comprises: one or more sensors; one or more processors; memory coupled to the one or more processors and configured to store instructions, which, when executed by the one or more processors, causes the one or more processors to perform operations comprising: receiving, by the one or more sensors of a mobile device, sensor data; determining compass offset data for a compass view based on the sensor data and map data; determining a corrected compass view based on the compass offset data; and presenting the corrected compass view.

In some implementations, a non-transitory, computer-readable storage medium having stored thereon instructions, which, when executed by one or more processors of a mobile device, causes the one or more processors to perform operations comprising: receiving, by one or more sensors of the mobile device, sensor data; determining compass offset data for a compass view based on the sensor data and map data; determining a corrected compass view based on the compass offset data; and presenting the corrected compass view.

Particular implementations disclosed herein provide one or more of the following advantages. Map data is used to compensate for compass inaccuracies and provide a more useful compass view and improved user experience.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example System

Figure 1A:
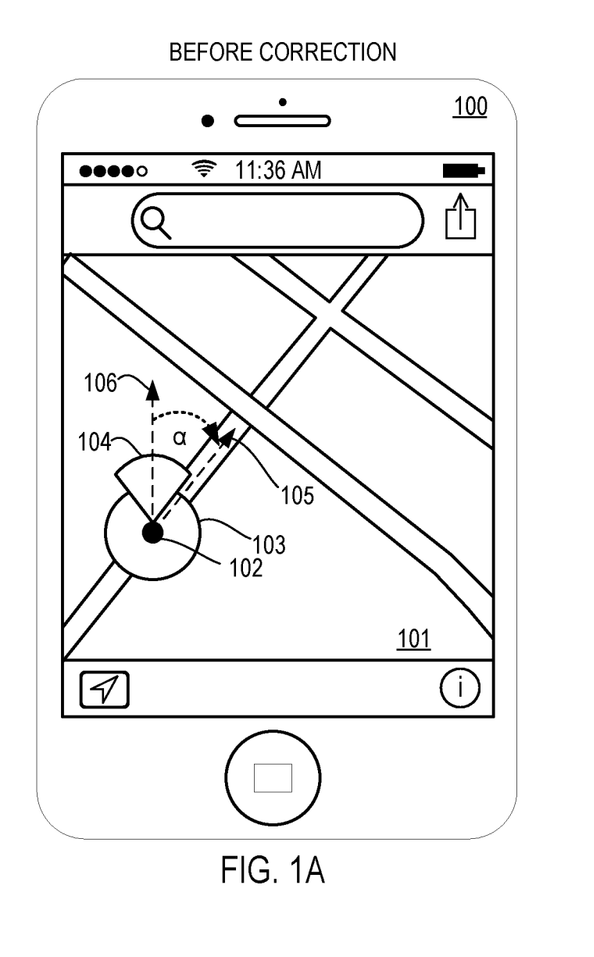
FIGS. 1A and 1B illustrate correction of an example compass view of a mobile device using map data, according to an embodiment.
Figure 1B:
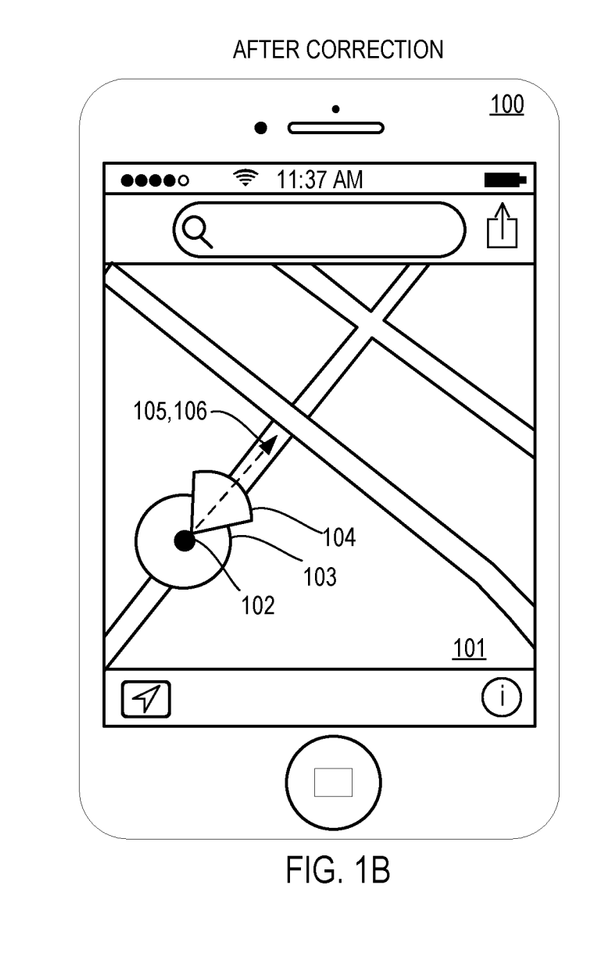

FIGS. 1A and 1B illustrate correction of an example compass view of mobile device using map data, according to an embodiment. Referring to FIG. 1A, mobile device 100 includes compass view 101 before correction. Compass view 101 includes a map with marker 102, error circle 103 and direction indicator 104. Marker 102 indicates a location of mobile 100 device on the map and can be, for example, a "push pin" or any other graphical object. The location can be provided by a positioning system such as a satellite-based (e.g. GPS) or terrestrial-based positioning system (e.g., WiFi, cell). Error circle 103 surrounds marker 102 and has a radius that represents an uncertainty in the position estimate provided by the positioning system. For example, in an implementation an estimator (e.g., a Kalman filter) can be used to provide location information (e.g., latitude, longitude, altitude) based on sensor data and an uncertainty parameter in the position estimate (e.g., an error covariance). The larger the uncertainty in the position estimate, the larger the radius of error circle 103.

Direction indicator 104 indicates the estimated direction of travel of mobile device 100. In an implementation, mobile device 100 includes a magnetometer that provides data that can be processed by, for example, an electronic compass application running on a processor of mobile device 100. The electronic compass application can generate a compass heading which can be used to draw direction indicator 104 on the map in compass view 101. In practice, the direction of travel is an estimate due to a compass offset angle α (e.g., an angle offset in radians or degrees), resulting from sensor measurement error. For example, a user viewing a display of mobile device 100 may observe marker 102 moving along a street in the map that indicates a direction of travel of mobile device 100. But due to the compass offset angle α, direction indicator 104 may not point in the actual direction of travel, as shown in FIG. 1A. This inconsistency between the direction indicator 104 and the actual direction of travel results in a poor user experience.

In the example shown, direction indicator 104 has a cone or beam shape. However, any graphical object that can be used to indicate direction can also be used (e.g., an arrow, text). The interior angle of the cone or beam can provide an estimate of the uncertainty in the compass heading (larger angle=larger uncertainty). In an implementation, direction indicator 104 can also be speech audio provided by, for example, a digital or virtual navigation assistant.

Referring to FIG. 1B, mobile device 100 includes compass view 101 after correction. Direction indicator 104 is corrected by aligning or "snapping" direction indicator 104 to vector map data, which in this example is vector 105 corresponding to a street centerline. The correction is made by removing the compass offset angle α between vector 106 and vector 105 directed along the street centerline. The aligning or snapping of direction indicator 104 is triggered when certain conditions are satisfied, as is described in further detail with respect to FIGS. 2-4.

Figure 2:
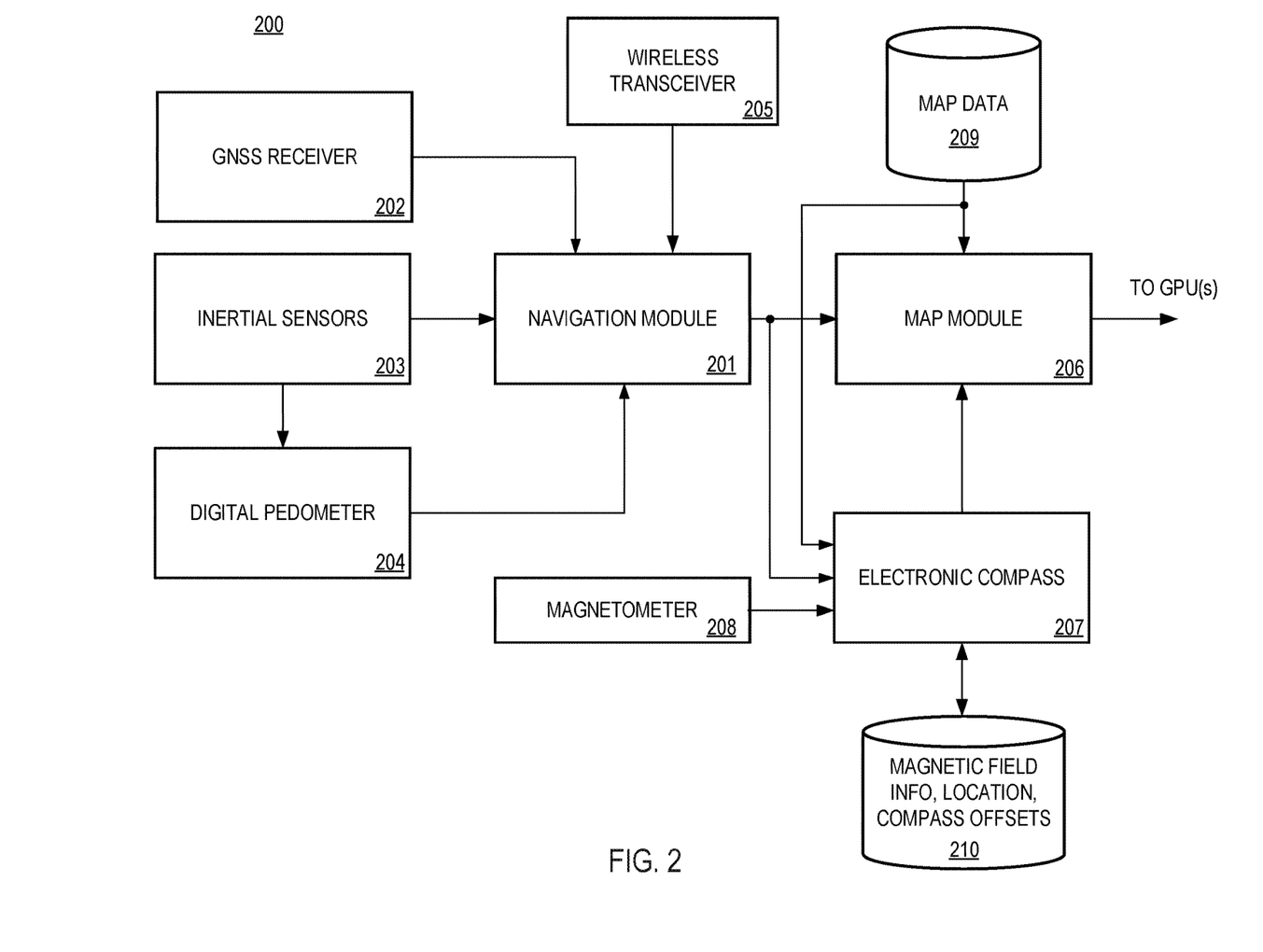
FIG. 2 is a block diagram of an example system for correcting a compass view using map data, according to an embodiment.

FIG. 2 is a block diagram of an example system 200 for correcting a compass view using map data, according to an embodiment. In some implementations, system 200 includes navigation module 201, GNSS receiver 202, inertial sensors 203, digital pedometer 204, wireless transceiver 205, map module 206, magnetometer 208 and electronic compass 207.

In some implementations, navigation module 201 includes software that when configured receives sensor data from GNSS receiver 202, inertial sensors 203 and magnetometer 208. GNSS receiver 202 can be any satellite-based positioning system, such as Global Positioning System (GPS). Inertial sensors 203 can include any type of inertial sensor, including but not limited to: accelerometers, gyro rate sensors and barometers. Magnetometer 208 determines the direction of Earth's magnetic field. Data from GNSS receiver 202, sensors 203 and magnetometer 208 (collectively, "sensor data") are input to a state estimator in navigation module 201. In some implementations, the state estimator can include one or more of a Kalman filter, least squares estimator and particle filter. The state estimator uses the sensor data to estimate the location (e.g., latitude, longitude, altitude) of mobile device 100 in a reference coordinate frame (e.g., a geodetic, local-level coordinate frame).

In some implementations, navigation module 201 receives wireless transceiver data from wireless transceiver 205 (e.g., received signal strength indicator (RSSI), wireless transmitter identifiers) that can be used by the state estimator to estimate the location of mobile device 100 using, for example, WiFi positioning or cellular network positioning systems.

In some implementations, navigation module 201 can also receive data (e.g., number of steps, step frequency, distance traveled) from digital pedometer 204. Digital pedometer 204 detects steps of a pedestrian user of mobile device 100 by monitoring sensor data (e.g., acceleration and/or gyro data) provided by inertial sensors 203. Digital pedometer 204 data can be used to determine if the user is walking, i.e., a pedestrian, rather than riding in a car.

The estimated location generated by navigation module 201 is provided as input to map module 206. Map module 206 can be implemented in software and/or hardware and generates compass view 101 as shown in FIGS. 1A and 1B using map data from map database 209. For example, direction indicator 104 can be generated by map module 206 as described in reference to FIGS. 1A and 1B. Map module 206 can send map data and overlay information (e.g., marker 102, error circle 103, direction indicator 104) to, for example, a graphics processing unit (GPU), where it can be rendered as compass view 101 on a display of mobile device 100.

Map module 206 is also coupled to electronic compass 207. Electronic compass 207 can be implemented in software and/or hardware and is configured to receive magnetometer data from magnetometer 208 and generate a compass heading and compass offset data (e.g., an offset angle) using the magnetometer data. Navigation module 201 can be configured to estimate an orientation or attitude of mobile device 100 (e.g., roll, pitch, yaw) in reference coordinates (e.g., body coordinates) and send the estimated orientation to electronic compass 207 for use in determining the compass heading and the compass offset data. In some implementations, the state estimator in navigation module 201 can estimate a measurement bias (e.g., as a state in a Kalman filter) that can be used by electronic compass 207 to calibrate raw measurements generated by magnetometer 208.

In some implementations, electronic compass 207 stores magnetic field information (e.g., RSSI values), compass offset data and corresponding locations in database 210 to allow faster correction of compass view 101 using stored compass offset data when mobile device 100 is at a location in database 210. In some implementations, the compass offset data can be provided to navigation engine 201 so that a measurement bias can be estimated by the state estimator included in navigation module 201.

In an example use case, a user is walking down a street, avenue, boulevard, path, highway, trail, walkway or route (hereinafter, collectively referred to as "route"). The user is carrying a mobile device that includes system 200. The user has invoked a navigation application and is tracking her progress on a map displayed on the mobile device as she travels the route. FIGS. 1A and 1B show an example compass view 101 that includes a map. The user's position represented by marker 102 is shown on the map. The user's position can be determined by, for example, a Kalman filter implemented by navigation module 201 based on data provided by one or more of the GNSS receiver 202 (e.g., a GPS receiver), inertial sensors 203 and digital pedometer 204.

Magnetometer 208 provides magnetic field data that can be used by electronic compass 207 to estimate the user's direction of travel, which is indicated in compass view 101 by direction indicator 104. The local magnetic field sensed by the magnetometer 208 is the earth's magnetic field (which provides North heading) combined with other magnetic fields generated by magnetic aggressors in the environment, e.g., metal bars in roads/bridges, power lines, electronic equipment, etc. These interfering fields can introduce error in the heading estimated by electronic compass 207.

Electronic compass 207 provides compass data to map module 206 which uses the compass data to continuously update direction indicator 104 while the user is traveling along the route, as shown in FIG. 1A and 1B. Map module 206 receives map data from map database 209 and uses the map data to update the map, such as moving marker 102 or update one or more layers of the map. In some implementations, map data can be from provided by the publicly available geographical information system (GIS) or Topologically Integrated Geographic Encoding and Referencing (TIGER) database provided by the United States Census Bureau. Because the compass data is often subjected to interfering magnetic fields from environmental aggressors, direction indicator 104 can have a compass angle offset. The compass angle offset causes direction indicator 104 to not point in the direction of travel of the user (e.g., does not point down the street). The user sees a compass view like example compass view 101 shown in FIG. 1A, where direction indicator 104 is pointing away from the direction of travel represented by street centerline vector 105.

In some implementations, the user's position and direction of travel can be used to determine if the user is walking a known route. For example, the user's GNSS coordinates (e.g., latitude and longitude) can be used (e.g., reverse geocoded) to determine if the GNSS coordinates intersect or are proximate to a known route represented by map data in map database 209. The user's direction of travel (e.g., computed from GNSS velocity data) can be used to determine the user's direction of travel in, for example, a WGS84 Earth-centered-Earth-fixed (ECEF) reference frame. Once system 200 determines the user is likely to be walking on a particular street in map database 209, street centerline data can be retrieved from map database 209. For example, a route can be described by a sequence of linear line segments. Each linear line segment can be a simple vector defined by two sets of latitude and longitude coordinates. The coordinates can also be defined with respect to the WGS84 ECEF reference frame for comparison with GNSS velocity vectors. In implementations where a map database is not available, a street centerline vector 105 can be derived from a point cloud of GNSS points using a map projection that projects the GNSS points onto an x-y-z coordinate frame and then using, for example, principle curves or piecewise polynomial fitting and B-spline approximation.

After street centerline vector 105 and direction indicator vector 106 are determined the compass offset angle α is determined from the dot product Equation [1]:

$$\alpha = \cos^{-1} \frac{\vec{v}_{cl} \cdot \vec{v}_{di}}{\|v_{cl}\|\|v_{di}\|}, \quad [1]$$

where $\vec{v}_{cl}$ is a vector representing the street centerline in WGS84 ECEF and $\vec{v}_{di}$ is a vector representing the pointing direction of direction indicator 104 in WGS84 ECEF.

After α is determined using Equation [1], direction indicator vector 106 can be rotated ("snapped") by α degrees (or radians) towards street centerline vector 105 so that vectors 105 and 106 are aligned (the compass offset angle is removed). The alignment of vectors 105, 106 results in a better user experience because direction indicator 104 is now pointing in the direction of travel of the user.

In some implementations, the user may have traveled the street in the past. In this use case, the compass offset angle α may be retrieved from database 210 rather than computed. For example, each time a compass offset angle α is computed it can be stored in database 210 together with other data (e.g., magnetic field strength, position coordinates). If the user's location and/or magnetic field strength data match the user's current location and local field strength data, then a pre-computed compass offset angle can be retrieved from database 210 rather than computed from Equation [1].

Example Processes

Figure 3:
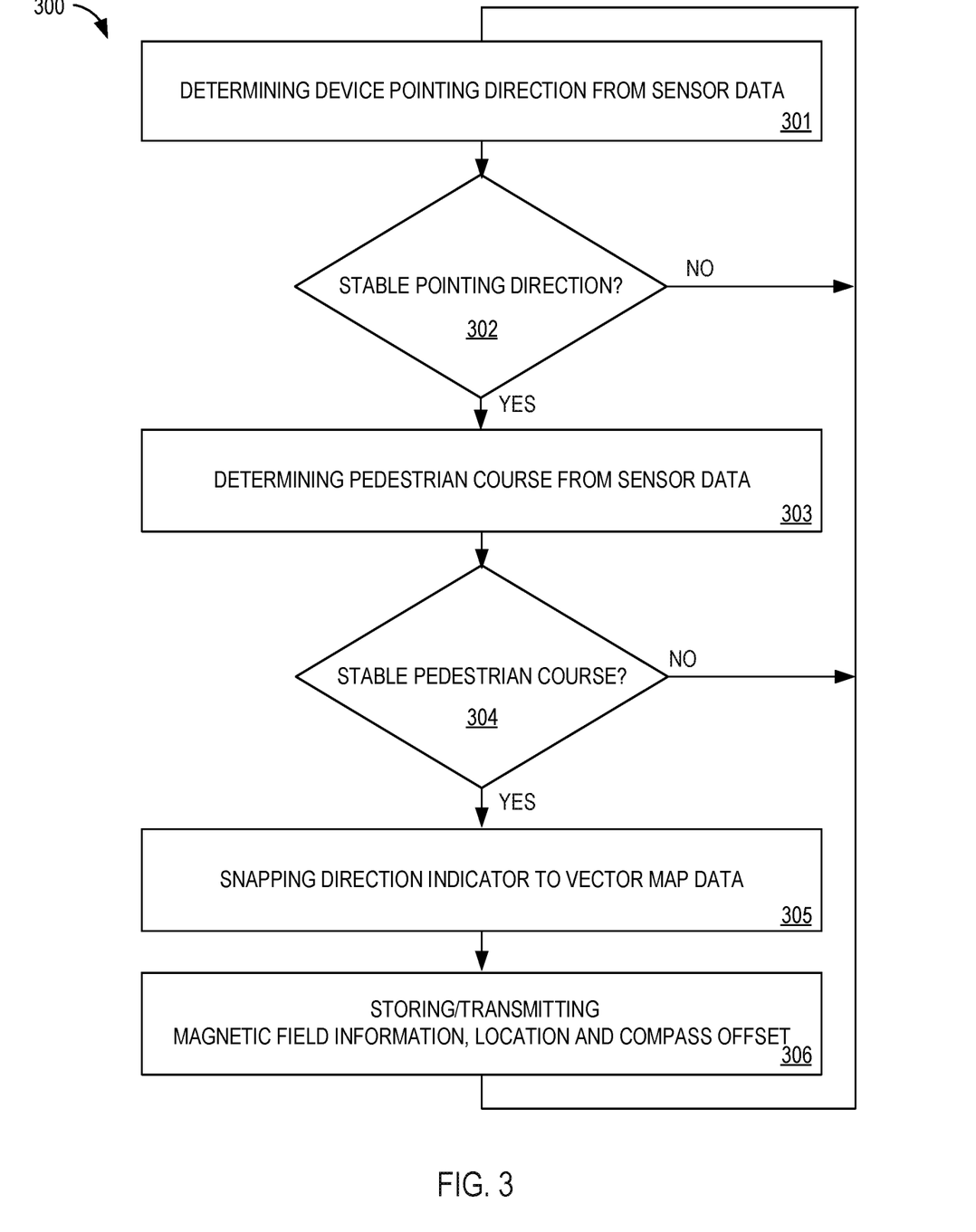
FIG. 3 is a flow diagram of an example process for correcting a compass view using map data, according to an embodiment.

FIG. 3 is a flow diagram of an example process 300 for correcting a compass view of a mobile device (e.g., mobile device 100) using map data, according to an embodiment. Process 300 can be implemented using, for example, the device architecture described in reference to FIG. 5.

In some implementations, process 300 can begin by determining a device pointing direction from sensor data (301). For example, an accelerometer can be used to determine an orientation of the mobile device. Additionally, gyroscope data can be used. The orientation data can be used to determine how a user is holding the mobile device, such as holding the device display screen up and pointing in the direction of travel. Process 300 can then determine if the point direction is stable (302). For example, the orientation data (e.g., yaw, pitch, roll or quaternion elements) does not vary by a first threshold amount (e.g., 5 degrees), the pointing direction of the mobile device is determined to be stable. This first condition indicates that the user is currently using the mobile device to navigate. For example, a typical user will hold the mobile device in a stable position face up so that the user can read their location on a map. Additional conditions can include ensuring that the display of mobile device 100 is viewable (determined to be facing up based on the orientation data), mobile device 100 is on the user's body (e.g., based on acceleration data) and/or mobile device 100 is not concealed in the user's pocket, bag or other enclosure or pressed against the user's ear because the user is on a telephone call (e.g., based on an ambient light sensor and/or proximity detector and other sensors).

Process 300 can continue by determining a pedestrian course from sensor data (303). If the pedestrian course is determined 304 to be stable, the direction indicator is aligned or "snapped" to vector map data (305), which in this example is a street centerline vector (e.g., vector 105), as described in reference to FIG. 2 In some implementations, the pedestrian course data can be determined by a direction of travel of the mobile device. The direction of travel can be calculated from location data, sensor data (e.g., acceleration data) and/or pedometer data (indicating that the user is walking rather than riding in a car). In an implementation, an estimated position and velocity generated by a navigation module (e.g., navigation module 201) can be used with map data to determine a direction of travel of the user. For example, the position and velocity can be used to determine that a user is walking in a particular direction along a particular street for a period of time (e.g., a time threshold). If process 300 determines that the user is walking along a particular street (rather than being stationary as determined by non-zero acceleration data) without deviating from the direction of travel for a threshold period of time, then process 300 determines 304 that the pedestrian course is stable. Process 300 can continue by snapping the direction indicator to vector map data (305). For example, the vector map data can be a street centerline vector and the snapping can be achieved by removing the compass offset angle α, such that the direction indicator pointing vector aligns with the street centerline vector.

Process 300 can continue by storing magnetic field data, compass offset data and location data in a database (306). This compass offset data can be used to determine mean compass offset data, as described in reference to FIG. 4. The magnetic field data can include for example, field strength for x, y, z axes. The location data can be provided by the navigation module (e.g., latitude, longitude, altitude) and corresponds to and is associated in the database with the magnetic field data and compass offset data. In some implementations, when the mobile device is at a location stored in the database, the corresponding compass offset data can be retrieved and used to correct the compass view by snapping/aligning the direction indicator to be along the actual direction of travel.

Figure 4:
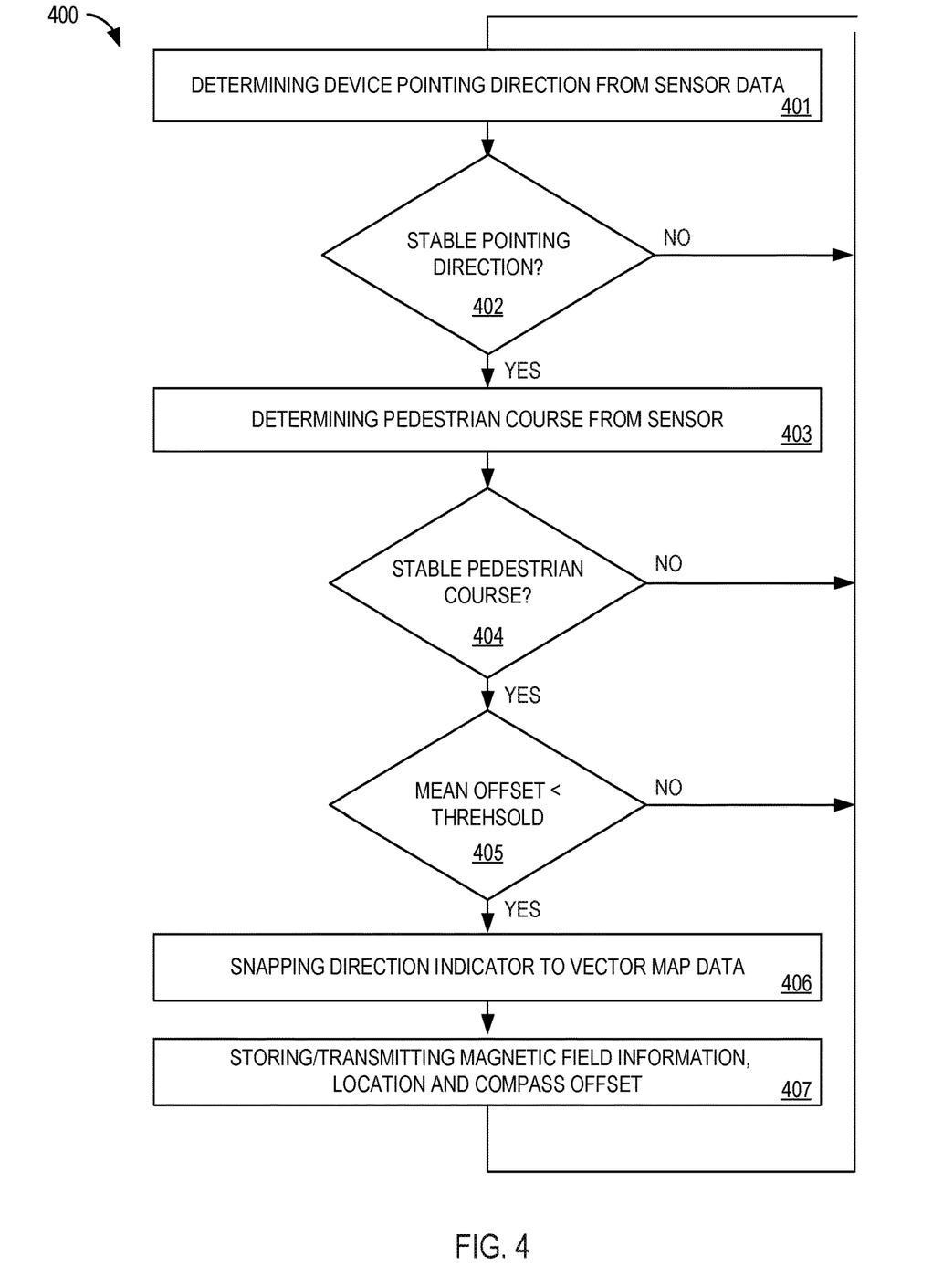
FIG. 4 is a flow diagram of an alternative example process for correcting a compass view using map data, according to an embodiment.

FIG. 4 is a flow diagram of an alternative example process 400 for correcting a compass view using map data, according to an embodiment. Process 400 can be implemented using, for example, the device architecture described in reference to FIG. 5.

In some implementations, steps 401-404 of process 400 are performed in the same manner as steps 301-305 of process 300, except after step 404 a mean compass offset is compared to a threshold value. For example, if process 400 determines (405) that the mean compass offset α is less than (or less than or equal to) a threshold value (e.g., 45°), then the direction indicator is snapped to map vector data (406), which in this example is a street centerline vector. In some implementations, the mean compass offset can be determined from compass offset data provided by a plurality of devices (e.g., crowd source data) operating at the location of interest over a period of time. For example, in addition to storing the compass offset data 407, mobile devices can transmit the compass offset data to a network connection (e.g., Internet connection) using wireless transceiver 205. At the server, the compass offset data can be computed and transmitted to mobile devices upon request or in response to a triggered or scheduled event. In some implementations, a mean compass offset data can be calculated by averaging sensor measurements using, for example, a low pass filter. Using a mean compass offset ensures that the snapping is not triggered by spurious sensor noise, such as noise caused by magnetic interference from nearby objects (e.g., bridge, train, bus). If the compass offset data is inaccurate due to external magnetic interference, the snapping could result in misalignment of the direction indicator after snapping is performed.

Example Device Architecture

Figure 5:
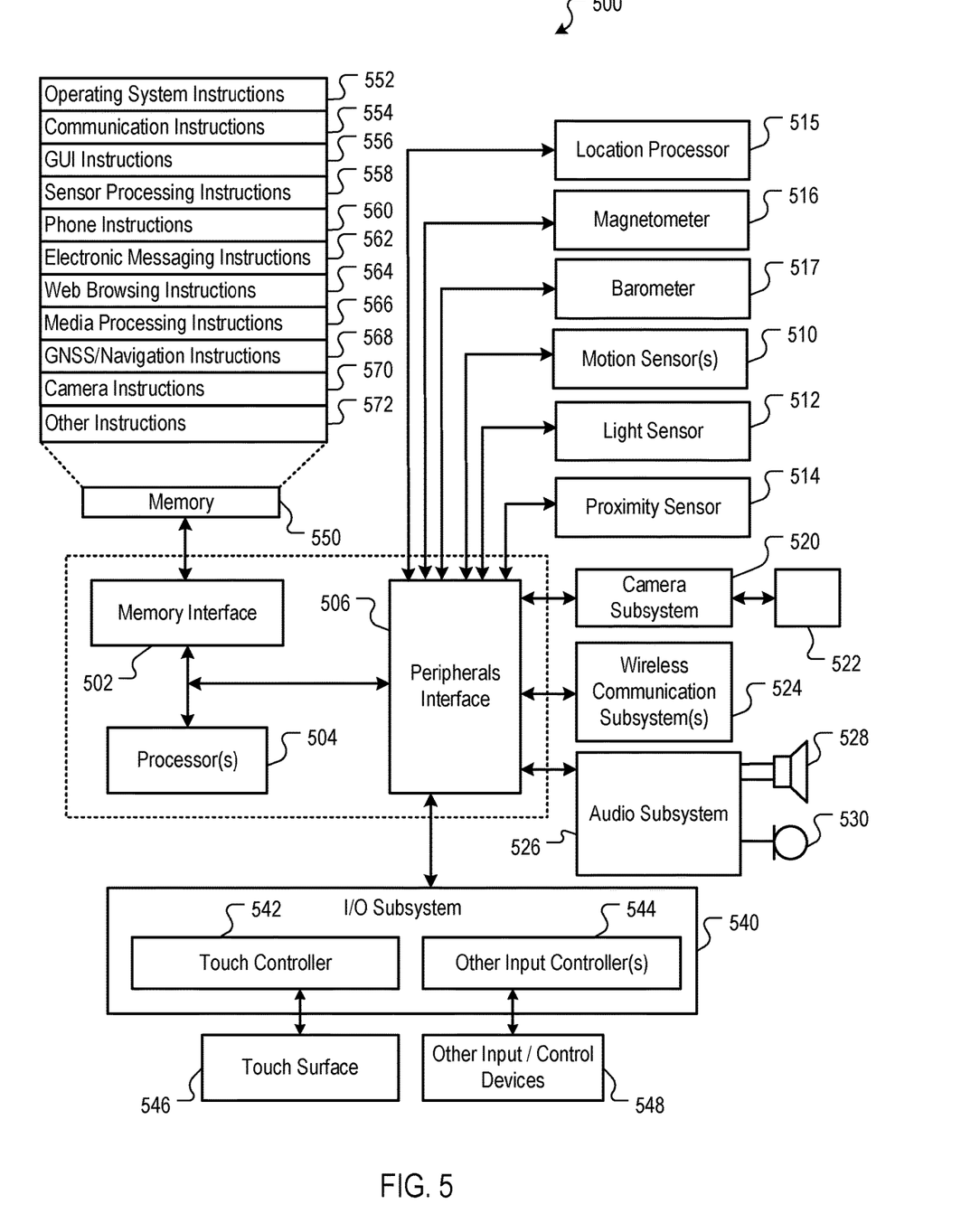
FIG. 5 is a block diagram of example device architecture for implementing the features and processes described in reference to FIGS. 1-4.

FIG. 5 is a block diagram of example device architecture 500 for implementing the features and processes described in reference to FIGS. 1-4. Architecture 500 may be implemented in any mobile device for generating the features and processes described in reference to FIGS. 1-4, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 506, such as a temperature sensor, a barometer 517, a biometric sensor, or other sensing device, to facilitate related functionalities. For example, a biometric sensor can detect fingerprints and monitor heart rate and other fitness parameters.

Location processor 515 (e.g., GNSS receiver chip) may be connected to peripherals interface 506 to provide geo-referencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication sub systems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, iOS, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the features and processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define one or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, by one or more sensors of a mobile device, sensor data;
determining, by a processor of the mobile device, a variation in orientation of the mobile device based on the sensor data;
determining, by the processor, that the variation in orientation of the mobile device is less than a threshold value; and
responsive to determining that the variation in orientation of the mobile device is less than the threshold value:
determining, by the processor of the mobile device, compass offset data for a compass view based on the sensor data and map data;
determining, by the processor, a corrected compass view based on the compass offset data;
determining a direction of travel for the mobile device;
determining a mean compass offset from compass offset data provided by a plurality of mobile devices at a location of interest over a period of time;
comparing the mean compass offset to a second threshold value; and
responsive to the comparing, presenting, by the processor, the corrected compass view.

2. The method of claim 1, wherein the compass offset data is an angle between a first vector representing a direction indicator in the compass view and vector map data.

3. The method of claim 2, wherein the vector map data includes a route centerline.

4. The method of claim 3, where the vector map data represents a direction of traffic flow on the route.

5. The method of claim 1, wherein determining, by the processor, the corrected compass view further comprises:
responsive to the comparing, correcting a direction indicator in the compass view using the compass offset data and the map data.

6. The method of claim 5, wherein the direction indicator has a cone or beam.

7. The method of claim 1, further comprising:
determining a location of the mobile device; and
storing the location of the mobile device and magnetic field information detected at the determined location of the mobile device.

8. The method of claim 1, further comprising:
determining the compass offset data for the mean compass offset;
comparing the mean compass offset data to the second threshold value; and
determining a corrected compass view based on the comparing.

9. A mobile device, comprising:
one or more sensors;
one or more processors;
memory coupled to the one or more processors and configured to store instructions, which, when executed by the one or more processors, causes the one or more processors to perform operations comprising:
receiving, by the one or more sensors of the mobile device, sensor data;
determining, by the one or more processors, a variation in orientation of the mobile device based on the sensor data;
determining, by the one or more processors, that the variation in orientation of the mobile device is less than a threshold value; and
responsive to determining that the variation in orientation of the mobile device is less than the threshold value:
determining compass offset data for a compass view based on the sensor data and map data;
determining a corrected compass view based on the compass offset data;
determining a direction of travel for the mobile device;
determining a mean compass offset from compass offset data provided by a plurality of mobile devices at a location of interest over a period of time;
comparing the mean compass offset to a second threshold value; and
responsive to the comparing, presenting the corrected compass view.

10. The mobile device of claim 9, wherein the compass offset data is an angle between a first vector representing a direction indicator in the compass view and vector map data.

11. The mobile device of claim 10, wherein the vector map data includes a route centerline.

12. The mobile device of claim 11, where the vector map data represents a direction of traffic flow on the route.

13. The mobile device of claim 9, wherein determining, by the processor, the corrected compass view further comprises:
responsive to the comparing, correcting a direction indicator in the compass view using the compass offset data and the map data.

14. The mobile device of claim 13, wherein the direction indicator has a cone or beam shape.

15. The mobile device of claim 9, further comprising:
a location processor;
a storage device;
determining, by the location processor, a location of the mobile device; and
storing, by the storage device, the location of the mobile device and magnetic field information detected at the determined location of the mobile device.

16. The mobile device of claim 9, further comprising:
determining the compass offset data for the mean compass offset;
comparing the mean compass offset to the second threshold value; and
determining a corrected compass view based on the comparing.

17. A non-transitory, computer-readable storage medium having stored thereon instructions, which, when executed by one or more processors of a mobile device, causes the one or more processors to perform operations comprising:
receiving, by one or more sensors of the mobile device, sensor data;
determining, by the one or more processors, a variation in orientation of the mobile device based on the sensor data;
determining, by the one or more processors, that the variation in orientation of the mobile device is less than a threshold value; and
responsive to determining that the variation in orientation of the mobile device is less than the threshold value:
determining compass offset data for a compass view based on the sensor data and map data;

determining a corrected compass view based on the compass offset data;

determining a direction of travel for the mobile device;

determining a mean compass offset from compass offset data provided by a plurality of mobile devices at a location of interest over a period of time;

comparing the mean compass offset to a second threshold value; and responsive to the comparing, presenting the corrected compass view.

18. The non-transitory, computer-readable storage medium of claim 17, further comprising:

responsive to the comparing, correcting a direction indicator in the compass view using the compass offset data and the map data.

19. The non-transitory, computer-readable storage medium of claim 17, further comprising:

determining the compass offset data for the mean compass offset;

comparing the mean compass offset to the second threshold value; and determining a corrected compass view based on the comparing.

20. The non-transitory, computer-readable storage medium of claim 17, further comprising:

determining a location of the mobile device; and storing the location of the mobile device and magnetic field information detected at the determined location of the mobile device.

21. The method of claim 1, wherein the corrected compass view is determined responsive to:

determining the mean compass offset data, and determining that the mean compass offset data is less than a second threshold value.

22. The method of claim 1, wherein the second threshold value is greater than zero.

\* \* \* \* \*